United States Patent [19]
Yamamoto

[11] Patent Number: 4,746,797
[45] Date of Patent: May 24, 1988

[54] RADIATION IMAGE RECORDING AND READ-OUT APPARATUS

[75] Inventor: Takaaki Yamamoto, Kanagawa, Japan

[73] Assignee: Fuji Photo Film Co., Ltd., Kanagawa, Japan

[21] Appl. No.: 833,700

[22] Filed: Feb. 27, 1986

[30] Foreign Application Priority Data

Mar. 1, 1985 [JP] Japan .................................. 60-40687

[51] Int. Cl.[4] ........................ G01T 1/161; G01T 1/105
[52] U.S. Cl. .................................... 250/327.2; 271/5; 271/6; 271/9; 271/12; 271/184; 271/185
[58] Field of Search .................. 250/327.2, 484.1; 378/172, 173, 174; 271/185, 184, 12, 9, 6, 5

[56] References Cited

U.S. PATENT DOCUMENTS

| | | | |
|---|---|---|---|
| 3,971,949 | 7/1976 | Bräther | 378/173 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,387,428 | 6/1983 | Ishida et al. | 364/414 |

FOREIGN PATENT DOCUMENTS

| | | | |
|---|---|---|---|
| 0137495 | 4/1985 | European Pat. Off. | 378/172 |
| 11395 | 2/1981 | Japan | 250/327.2 |

Primary Examiner—Janice A. Howell
Assistant Examiner—Constantine Hannaher
Attorney, Agent, or Firm—Sughrue, Mion, Zinn, Macpeak & Seas

[57] ABSTRACT

An apparatus for recording and reading a radiation image comprises an image recording section provided with a first stacker for stacking stimulable phosphor sheets carrying no radiation image stored therein and a second stacker for stacking stimulable phosphor sheets carrying a radiation image stored therein, an image read-out section provided with a third stacker for stacking the stimulable phosphor sheets conveyed from the second stacker and a sheet feeder for feeding the stimulable phosphor sheets carrying no radiation image stored therein to the first stacker, a light-tight connector for rotatably connecting the image recording section with the image read-out section, and a drive unit for rotating the image recording section. The stimulable phosphor sheets are transferred via the light-tight connector between the sheet feeded and the first stacker, and between the second stacker and the third stacker.

10 Claims, 3 Drawing Sheets

RADIATION IMAGE RECORDING AND READ-OUT APPARATUS

BACKGROUND OF THE INVENTION

1. Field of the Invention

This invention relates to a radiation image recording and read-out apparatus using a stimulable phosphor sheet. This invention particularly relates to a radiation image recording and read-out apparatus comprising a rotatable image recording section and an image read-out section which are formed integrally with each other.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, and Japanese Unexamined Patent Publication No. 56(1981)-11395, it has been proposed to use a stimulable phosphor in a radiation image recording and reproducing system. Specifically, a sheet comprising the stimulable phosphor is first exposed to a radiation passing through an object to have a radiation image stored therein, and is then scanned with stimulating rays which cause it to emit light in proportion to the radiation energy stored. The light emitted by the stimulable phosphor sheet when the sheet is exposed to the stimulating rays is photoelectrically detected and converted to an electric image signal, which is processed as desired to reproduce a visible image having an improved quality, particularly a high diagnostic efficiency and accuracy. The finally obtained visible image may be reproduced on a recording material such as a photographic film or on a display device such as a cathode ray tube (CRT).

As the image recording apparatus for obtaining a radiation image of an object, there has heretofore been known an apparatus wherein a radiation source and an image recording position provided with a recording medium such as an X-ray film are positioned to face each other via the object and are integrally rotated together with the object or around the object. For example, in the case where the stomach of the human body is examined, the object (i.e. the human body) injected with a contrast medium is placed on a rotatable bed, and image recording is conducted by rotating the bed and inclining it at a predetermined angle. In the Magen image recording apparatus of this type, the radiation source and the image recording position where the recording medium is exposed to a radiation emitted by the radiation source via the object are constituted so that they are integrally rotatable together with the rotatable bed. Also in an image recording apparatus for mammography, the radiation source and the image recording position where the recording medium is positioned are constituted so that they are integrally rotatable around the mamma.

When the aforesaid stimulable phosphor sheet is used as the recording medium in the aforesaid rotatable image recording apparatus, it becomes necessary to use an image read-out apparatus for detecting the radiation image recorded on the stimulable phosphor sheet at the image recording apparatus. In this case, it is disadvantageous for the image recording apparatus and the image read-out apparatus to be formed separately, and they should be formed integrally with each other as an image recording section and an image read-out section of a single apparatus so that recording of the radiation image on the stimulable phosphor sheet and read-out of the radiation image from the stimulable phosphor sheet are carried out continuously.

When the image recording section and the image read-out section are formed integrally in a single apparatus, the image read-out section should not be rotated together with the rotatable image recording section since this makes the mechanism of the whole apparatus complicated and the apparatus large. Further, when the image read-out section is rotated together with the image recording section, a very real problem arises because of vibration caused by rotation at the image read-out section. For example, as the image read-out section rotates, vibration is transmitted to the image read-out optical system, and it is not always possible to conduct scanning of stimulating rays correctly. Also, the load on a motor for conveying the stimulable phosphor sheet at the image read-out step is caused to fluctuate, and it is not always possible to convey the stimulable phosphor sheet accurately and to read out the radiation image accurately. Further, in general, it is desired for the radiation image recording apparatus to be able to record a predetermined number of images when necessary. Particularly, in Magen image recording or the like, it is required to record a predetermined number of images continuously at arbitrary timing. Therefore, also when the image recording section and the image read-out section are formed integrally, it is desirable that image recording be conducted continuously at arbitrary timing independent of image read-out.

SUMMARY OF THE INVENTION

The primary object of the present invention is to provide a radiation image recording and read-out apparatus comprising an image recording section and an image read-out section formed integrally, which has a simple mechanism and is small.

Another object of the present invention is to provide a radiation image recording and read-out apparatus comprising an image recording section and an image read-out section formed integrally, wherein vibration at the image read-out section is prevented.

The specific object of the present invention is to provide a radiation image recording and read-out apparatus comprising an image recording section and an image read-out section formed integrally, wherein image recording is conducted continuously at arbitrary timing independent of image read-out.

The present invention provides a radiation image recording and read-out apparatus comprising:

(i) an image recording section provided with a radiation source for emitting a radiation to a stimulable phosphor sheet via an object, a sheet holding means for holding said stimulable phosphor sheet at an image recording position which faces said radiation source, a first stacking means for stacking stimulable phosphor sheets carrying no radiation image stored therein, a second stacking means for stacking stimulable phosphor sheets carrying a radiation image stored therein, and a conveyance means for conveying the stimulable phosphor sheets stacked at said first stacking means one by one to said sheet holding means and conveying each said stimulable phosphor sheet carrying a radiation image stored therein from said sheet holding means to said second stacking means, (ii) an image read-out section provided with an image read-out means for scanning said stimulable phosphor sheet carrying a radiation image stored therein at said image recording section with stimulating rays which cause said stimulable phosphor sheet to emit light in proportion to the stored radiation energy and detecting the emitted light to obtain an electric image signal, a third stacking means for stacking the stimulable phosphor sheets carrying a radiation image stored therein and conveyed from said second stacking means, a conveyance means for conveying the stimulable phosphor sheets stacked at said third stacking means one by one to said image read-out means, and a sheet feed means for temporarily stacking the stimulable phosphor sheets carrying no radiation image stored therein and feeding them to said first stacking means when necessary, (iii) a light-tight connection means for rotatably connecting said image recording section with said image read-out section, and (iv) a rotation drive means for rotating said image recording section around a predetermined axis, whereby said stimulable phosphor sheet is transferred via said light-tight connection means between said sheet feed means at said image read-out section and said first stacking means at said image recording section, and between said second stacking means at said image recording section and said third stacking means at said image read-out section.

In the radiation image recording and read-out apparatus of the present invention, since the image recording section is rotatably connected by the light-tight connection means with the image read-out section and the image read-out section is not rotated, it is possible to simplify the mechanism of the apparatus, to make the whole apparatus small, and to eliminate the problem caused by vibration at the image read-out section. Also, since the first stacking means for stacking the stimulable phosphor sheets carrying no radiation image stored therein and the second stacking means for stacking the stimulable phosphor sheets carrying a radiation image stored therein are positioned at the image recording section, and since the third stacking means for making the stimulable phosphor sheets carrying a radiation image stored therein wait for image read-out and the sheet feed means for temporarily stacking the stimulable phosphor sheets carrying no radiation image stored therein and feeding them to the image recording section when necessary are positioned at the image read-out section, it is possible to conduct image recording and image read-out independently of each other. Thus it is possible to conduct radiation image recording continuously on a predetermined number of the stimulable phosphor sheets at the image recording section and to conduct image read-out sequentially at the image read-out section, thereby efficiently carrying out the radiation image recording and read-out. The image read-out section may include an erasing means for erasing the radiation energy remaining on the stimulable phosphor sheet after the radiation image stored on the stimulable phosphor sheet is read by the image read-out means at the image read-out section. When the erasing means is incorporated in the image read-out section, and the image read-out means is connected with the erasing means and the erasing means is connected with the sheet feed means by the conveyance means at the image read-out section, it becomes possible to circulate and reuse the stimulable phosphor sheets in the apparatus as described, for example, in Japanese Unexamined Patent Publication No. 59(1984)-192240. , corresponding to U.S. patent application Ser. No. 600,689

DESCRIPTION OF THE PREFERRED EMBODIMENTS

The present invention will hereinbelow be described in further detail with reference to the accompanying drawings.

An embodiment of the radiation image recording and read-out apparatus in accordance with the present invention, which is provided with a rotatable bed, is described below.

In general, when an image is recorded by use of the rotatable bed, an object is placed on the rotatable bed, the bed is rotated, and image recording is conducted in a desired condition by monitoring changes in the radiation image of the image recording portion of the object as the bed rotates. For this purpose, a fluoroscopic device for receiving the radiation continuously irradiated via the object is normally used together with the image recording apparatus. The radiation image of the object is monitored by using the fluoroscopic device, a recording medium is inserted to a predetermined image recording position when the radiation image is in a desirable condition, and the radiation image is recorded.

Figure 1:
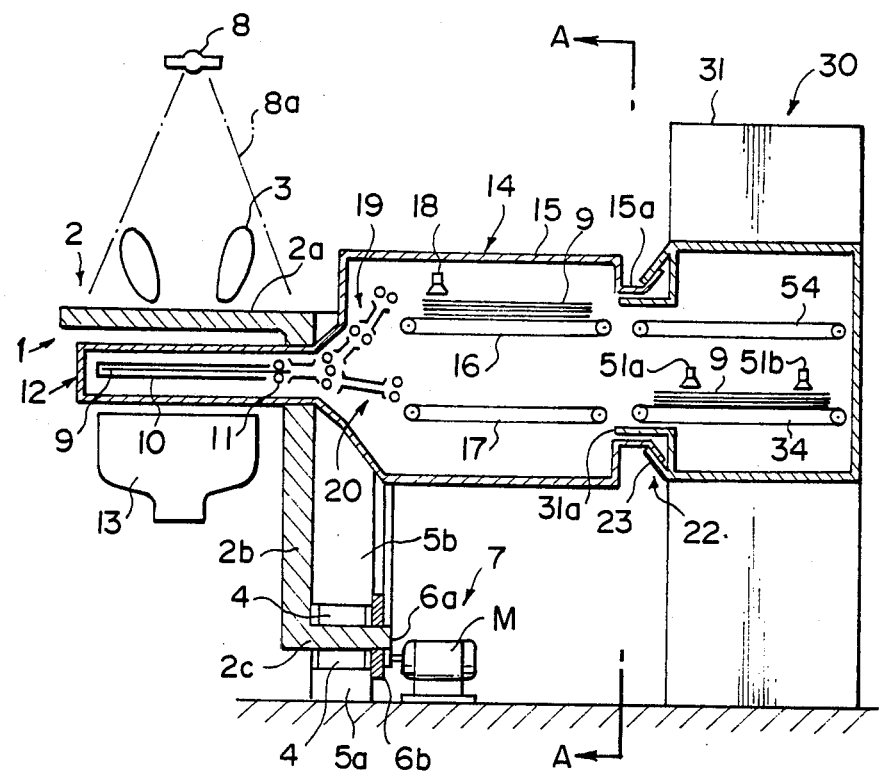
FIG. 1 is a schematic front view showing an embodiment of the radiation image recording and read-out apparatus in accordance with the present invention.
Figure 2:
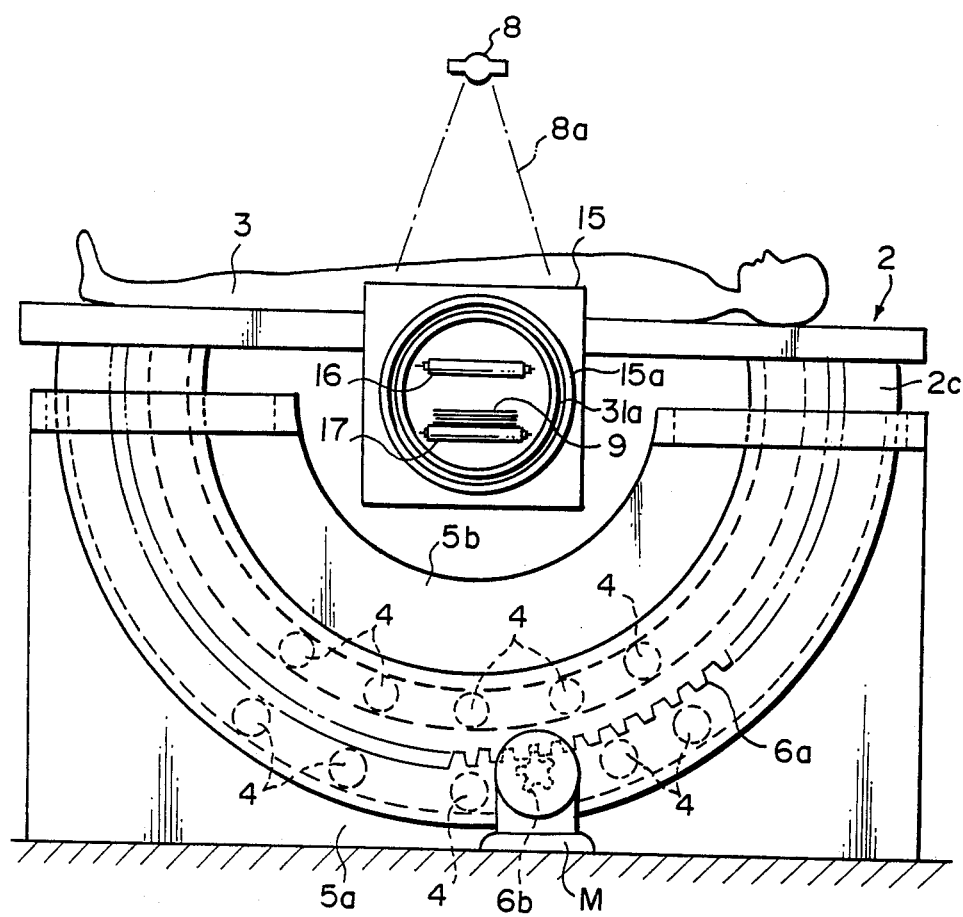
FIG. 2 is a schematic sectional view taken along line A—A of FIG. 1.
Figure 3:
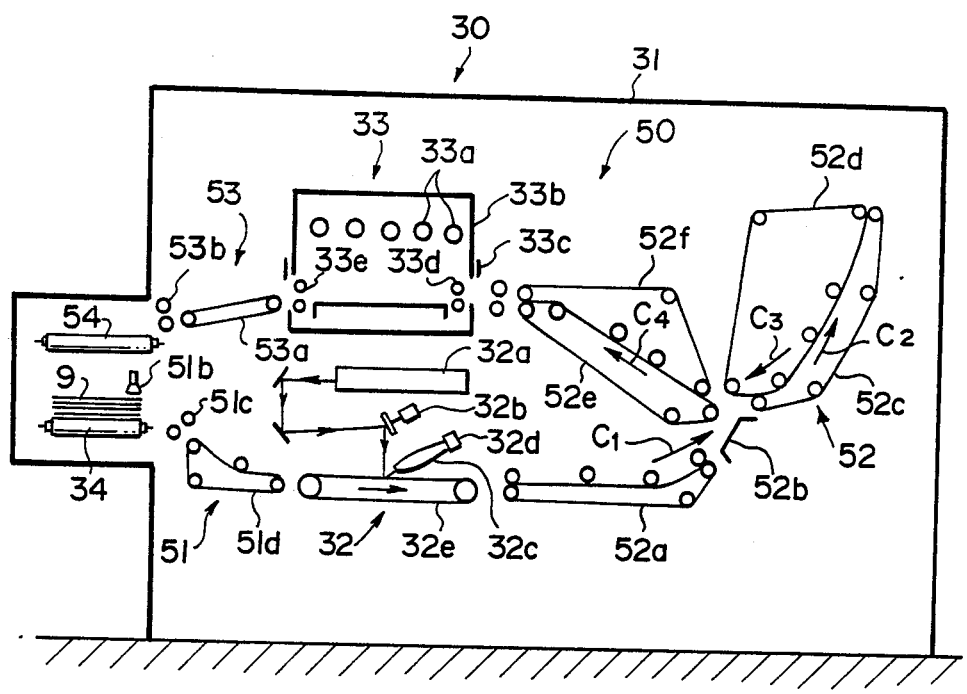
FIG. 3 is a schematic side view showing the right side of the image read-out section of the apparatus shown in FIG. 1.

Referring to FIGS. 1, 2 and 3 showing the case where the radiation image recording and read-out apparatus is used together with a fluoroscopic device, the radiation image recording and read-out apparatus basically comprises an image recording section 1, an image read-out section 30, a light-tight connection means 22 for connecting the image recording section 1 with the image read-out section 30, and a rotation drive means 7 for rotating the image recording section 1. The light-tight connection means 22 rotatably connects the image recording section 1 with the image read-out section 30.

At the image recording section 1, a rotatable bed 2 on which an object 3 is placed comprises an object supporting base 2a for supporting the object 3, a semi-circular supporting plate 2b for supporting the object supporting base 2a, and a circular arc-like flange 2c projecting normal to the surface of the supporting plate 2b along the outer circumference thereof. The circular arc-like flange 2c is sandwiched by a first guide member 5a and a second guide member 5b via a plurality of rollers 4 for rotation between and along the first guide member 5a and the second guide member 5b. The rotatable bed 2 can be rotated and adjusted to any inclination angle by the rotation drive means 7 comprising a gear 6a formed at the end face of the circular arc-like flange 2c, a pinion 6b for engagement with the gear 6a, and a motor M connected to the pinion 6b. On the other hand, a radiation source 8 for emitting a radiation 8a to the object 3 is positioned above the rotatable bed 2. Though not shown, the radiation source 8 is mounted on the rotatable bed 2 for rotation together therewith. Further, a sheet holding section 12 is mounted on the rotatable bed 2 at a position below the rotatable bed portion exposed to the radiation emitted by the radiation source 8. The sheet holding section 12 comprises a sheet holding member 10 for receiving a stimulable phosphor sheet 9 and holding it at the image recording position, and conveying rollers 11 for conveying the stimulable phosphor sheet 9 into and out of the sheet holding member 10. Below the sheet holding section 12, an image intensifier tube (I.I. tube) 13 acting as a fluoroscopic device is positioned for rotation together with the rotatable bed 2.

When a radiation image of the object 3 on the rotatable bed 2 is recorded, the radiation 8a is first emitted by the radiation source 8 onto the object 3 and received by the I.I. tube 13 without inserting the stimulable phosphor sheet 9 into the sheet holding member 10 at the sheet holding section 12. The radiation image detected by the I.I. tube 13 is displayed as a visible image on a CRT or the like (not shown) and is monitored. The rotatable bed 2 is rotated until a desired image is obtained, and emission of the radiation 8a is ceased. The stimulable phosphor sheet 9 is fed into the sheet holding member 10 by the conveying rollers 11, and the radiation 8a is emitted onto the object 3 to record the radiation image of the object 3 on the stimulable phosphor sheet 9. Then, the stimulable phosphor sheet 9 is conveyed out of the sheet holding member 10 by the conveying rollers 11 and sent to the image read-out and erasing steps. The sheet holding section 12 is connected to a sheet housing section 14 which comprises a light-tight case 15 formed integrally with the case of the sheet holding section 12, a first stacking means 16 provided with an endless belt for stacking the stimulable phosphor sheets 9 carrying no radiation image stored therein, a second stacking means 17 provided with an endless belt for stacking the stimulable phosphor sheets 9 carrying a radiation image stored therein, and a conveyance means for conveying the stimulable phosphor sheets 9 stacked by the first stacking means one by one into the sheet holding member 10 and conveying the stimulable phosphor sheets 9 carrying a radiation image stored therein out of the sheet holding member 10.

The conveyance means at the image recording section 1 comprises a suction cup 18 for taking the stimulable phosphor sheets 9 one by one out of the first stacking means 16, a sheet feed means 19 for conveying the stimulable phosphor sheet 9, which is taken up by the suction cup 18, into the sheet holding member 10, and a sheet unloading means 20 for placing the stimulable phosphor sheet 9, which is conveyed out of the sheet holding member 10, on the second stacking means 17. The first stacking means 16 and the second stacking means 17 are provided with a guide member (not shown) for preventing the stacked stimulable phosphor sheets 9 from falling when the sheet housing section 14 rotates together with the rotatable bed 2. The case 15 of the image recording section 1 and a case 31 of the image read-out section 30 where image read-out and erasing are conducted are connected by the light-tight connection means 22 so that the sheet housing section 14, the sheet holding section 12, the radiation source 8 and the I.I. tube 13 are integrally rotatable together with the rotatable bed 2 with respect to the image read-out section 30. The light-tight connection means 22 comprises a cylindrical flange 15a formed integrally with the case 15 of the sheet housing section 14 and having its center at the rotation center of the rotatable bed 2, a cylindrical flange 31a which is formed integrally with the case 31 of the image read-out section 30, and which is concentric with the flange 15a and slightly smaller than the flange 15a, and a light-tight seal member 23 for sealing the space between the flange 15a and the flange 31a against passage of light. One end of the seal member 23 is secured to the flange 15a, and the other end thereof slides against the flange 31a, thereby sealing the space between the flange 15a and the flange 31a against passage of light. Said space is sealed against passage of light to prevent radiation energy stored in the stimulable phosphor sheet 9 from decaying due to external light. On the other hand, the image read-out section 30 basically comprises the case 31, an image read-out means 32, and an erasing means 33. The image read-out section 30 is also provided with a third stacking means 34 for receiving the stimulable phosphor sheets 9 from the second stacking means 17 at the sheet housing section 14 and temporarily stacking them, a conveyance means 51 for taking the stimulable phosphor sheets 9 one by one from the third stacking means 34 and conveying them to the image read-out means 32, a conveyance means 52 having a switch-back mechanism for conveying the stimulable phosphor sheet 9 from the image read-out means 32 to the erasing means 33, a sheet ejecting means 53 for ejecting the stimulable phosphor sheet 9 from the erasing means 33 after radiation energy remaining on the stimulable phosphor sheet 9 is erased, and a sheet feed means 54 for temporarily stacking the stimulable phosphor sheets 9 conveyed by the sheet ejecting means 53 and feeding them one by one to the first stacking means 16 in the sheet housing section 14 when necessary. The conveyance means 51 for the image read-out section 30 comprises suction cups 51a and 51b for taking the stimulable phosphor sheets 9 one by one from the third stacking means 34, nip rollers 51c, and a conveyor belt 51d. The sheet ejecting means 53 comprises a conveyor belt 53a and nip rollers 53b.

At the image read-out means 32, the stimulable phosphor sheet 9 carrying a radiation image stored therein is scanned with stimulating rays emitted by a stimulating ray source 32a in the main scanning direction by use of a galvanometer mirror 32b, and at the same time is moved by a conveyor belt 32e in the sub-scanning direction. In this manner, the stimulable phosphor sheet 9 is caused by the stimulating rays to emit light in proportion to the stored radiation energy. The emitted light is guided via a light guide member 32c and photoelectrically detected by a photomultiplier 32d. At the erasing means 33, the stimulable phosphor sheet 9 is exposed to erasing light emitted by erasing lamps 33a, and radiation energy remaining on the stimulable phosphor sheet 9 after the image read-out is erased. In this manner, the stimulable phosphor sheet 9 is made reusable for image recording.

At the image read-out means 32, a laser beam source 32a is positioned above the conveyor belt 32e constituting a part of the image read-out means 32, and a galvanometer mirror 32b is positioned for scanning a laser beam emitted by the laser beam source 32 in the width direction of the stimulable phosphor sheet 9 placed on the conveyor belt 32e. The galvanometer mirror 32b is swung in both ways to deflect the laser beam in the main scanning direction on the sheet 9 carrying the radiation image stored therein. The sheet 9 which has been subjected to image recording by being held by the sheet holding member 10 at the sheet holding section 11 is then conveyed to the image read-out means 32 via the second stacking means 17 and the third stacking means 34. The light emitted by the sheet 9 when it is exposed to the laser beam impinges upon a light input face of the light guide member 32c directly or after being reflected by a light guiding reflection mirror positioned when necessary along the main scanning line. The emitted light enters the light guide member 32c from the light input face thereof, and is guided inside of the light guide member 32c through total reflection to a light output face thereof. The light is thus detected by a photomultiplier 32d connected to the light output face of the light guide member 32c. Simultaneously with the scanning of the sheet 9 by the laser beam in the main scanning direction, the sheet 9 is moved by the conveyor belt 32e in the sub-scanning direction as indicated by the arrow approximately normal to the main scanning direction, so that the radiation image is read out over the whole surface of the sheet 9. The electric image signal generated by the photomultiplier 32d is sent to an image processing circuit (not shown) for processing the electric image signal. The image signal thus processed is then sent to an image reproducing apparatus. The image reproducing apparatus may be a display device such as a CRT, or a device for reproducing a visible image by point-by-point scanning on a photographic film. Or, the image signal may be stored in a storage means such as a magnetic tape.

After image read-out is finished, the stimulable phosphor sheet 9 is conveyed by the conveyance means 52 for the erasing section to the erasing means 33 comprising a case 33b and many erasing light sources 33a, e.g. fluorescent lamps, tungsten-filament lamps, xenon lamps, or sodium lamps, arranged within the case 33b. After a shutter 33c is opened, the sheet 9 is conveyed until its forward end contacts nip rollers 33d. Then, the sheet 9 is conveyed by the rotating nip rollers 33d into the case 33b. Then, the shutter 33c is closed, and the erasing light sources 33a are turned on. The erasing light sources 33a mainly emit light having a wavelength within the stimulation wavelength range for the stimulable phosphor constituting the sheet 9. When the sheet 9 is exposed to the erasing light, the radiation energy remaining on the sheet 9 after the image read-out is released. At this time, since the shutter 33c is closed, no erasing light leaks into the image read-out means 32, and therefore no noise is generated in the read-out signal.

After the radiation energy remaining on the sheet 9 is erased to such an extent that another image recording on the sheet 9 is possible, nip rollers 32e are rotated and the sheet 9 is conveyed out of the erasing means 33.

Operations of the apparatus constructed as described above in accordance with the present invention will now be described below. First, a required number of stimulable phosphor sheets 9 erased by the erasing means 33 are sequentially stacked by the sheet ejecting means 53 onto the sheet feed means 54. Then, the first stacking means 16 is maintained horizontal (i.e. the rotatable bed 2 is maintained horizontal), and a required number of the stimulable phosphor sheets 9 stacked on the sheet feed means 54 are sequentially conveyed onto the first stacking means 16.

Thereafter, the rotatable bed 2 is rotated, and the radiation image of the object 3 is monitored by use of the I.I. tube 13 as mentioned above. When a desired image is obtained, the stimulable phosphor sheet 9 is taken up by the suction cup 18 and conveyed by the sheet feed means 19 and the conveying rollers 11 into the sheet holding member 10, and image recording is conducted. After the radiation image of the object 3 is recorded on the stimulable phosphor sheet 9, the sheet 9 is placed on the second stacking means 17 via the conveying rollers 11 and the sheet unloading means 20. In this manner, the stimulable phosphor sheets 9 on the first stacking means 16 are sequentially subjected to radiation image recording at desired timing and then stacked on the second stacking means 17.

The rotatable bed 2 is then returned to the horizontal position, and the stimulable phosphor sheets 9 stacked on the second stacking means 17 are conveyed in the stacked form to the third stacking means 34. The sheets 9 are then taken up one by one from the third stacking means 34, and conveyed by the conveyance means 51 for the image read-out section to the image read-out means 32.

When image read-out at the image read-out means 32 is completed, the stimulable phosphor sheet 9 is sent by the conveyance means 52 for the erasing section to the erasing means 33 (conveyance in the directions as indicated by the arrows C1, C2, C3 and C4). After radiation energy remaining on the stimulable phosphor sheet 9 is erased at the erasing means 33, the sheet 9 is conveyed by the conveyor belt 53a and the nip rollers 53b onto the sheet feed means 54.

The conveyance means 52 for the erasing section has the switch-back conveyance mechanism as described above. After the image read-out is conducted on the stimulable phosphor sheet 9 at the image read-out means 32, the sheet 9 is conveyed along a conveyor belt 52a and a guide plate 52b (conveyance in the direction as indicated by the arrow C1), and then conveyed in the direction as indicated by the arrow C2 by being grasped between conveyor belts 52c and 52d. When a position sensor or the like detects that the sheet 9 has been conveyed until its rear end is grasped between the conveyor belts 52c and 52d, the conveyor belts 52c and 52d are rotated reversely to switch back the sheet 9 in the direction as indicated by the arrow C3. The sheet 9 conveyed by the conveyor belts 52c and 52d in the direction as indicated by the arrow C3 is then grasped between conveyor belts 52e and 52f facing the left ends of the conveyor belts 52c and 52d, and conveyed by the conveyor belts 52e and 52f to the erasing means 33. At this time, the sheet 9 is moved reversely by the switch-back conveyance, and conveyed to the erasing means 33 with the stimulable phosphor surface facing up so that the stimulable phosphor surface of the sheet 9 is exposed to erasing light emitted by the erasing lamps 33a.

By repeating the aforesaid operations, the stimulable phosphor sheet 9 is circulated and reused for radiation image recording and read-out.

In the aforesaid embodiment, the image read-out section 30 includes the erasing means 33, and therefore the stimulable phosphor sheets can be circulated and reused in the apparatus. However, the image read-out section 30 need not necessarily include the erasing means 33. For example, the image read-out section 30 may be constructed so that the stimulable phosphor sheet after the image read-out at the image read-out means 32 is removed out of the image read-out section 30, erasing of radiation energy remaining on the sheet is conducted by use of a separate erasing apparatus, and then a predetermined number of the erased stimulable phosphor sheets are fed to the sheet feed means 54.

Further, though the image recording section in the aforesaid embodiment is of the type provided with the rotatable bed used for stomach examination or the like, the image recording section may be of any type such as a mamma image recording section insofar as the radiation source and the stimulable phosphor sheet positioned with an object intervening therebetween rotate together with the object or around the object.

I claim:

1. A radiation image recording and read-out apparatus comprising:
   (i) an image recording section provided with a radiation source for emitting a radiation to a stimulable phosphor sheet via an object, a sheet holding means for holding said stimulable phosphor sheet at an image recording position which faces said radiation source, a first stacking means for stacking stimulable phosphor sheets carrying no radiation image stored therein, a second stacking means for stacking stimulable phosphor sheets carrying a radiation image stored therein, and a conveyance means for conveying the stimulable phosphor sheets stacked at said first stacking means one by one to said sheet holding means and conveying each said stimulable phosphor sheet carrying a radiation image stored therein from said sheet holding means to said second stacking means,
   (ii) an image read-out section provided with an image read-out means for scanning said stimulable phosphor sheet carrying a radiation image stored therein at said image recording section with stimulating rays which cause said stimulable phosphor sheet to emit light in proportion to the stored radiation energy and detecting the emitted light to obtain an electric image signal, a third stacking means for stacking the stimulable phosphor sheets carrying a radiation image stored therein and conveyed from said second stacking means, a conveyance means for conveying the stimulable phosphor sheets stacked at said third stacking means one by one to said image read-out means, and a sheet feed means for temporarily stacking the stimulable phosphor sheets carrying no radiation image stored therein and feeding them to said first stacking means when necessary,
   (iii) a light-tight connection means for rotatably connecting said image recording section with said image read-out section, and
   (iv) a rotation drive means for rotating said image recording section around a predetermined axis,
      such that said stimulable phosphor sheet is transferred via said light-tight connection means between said sheet feed means at said image read-out section and said first stacking means at said image recording section, and between said second stacking means at said image recording section and said third stacking means at said image read-out section.

2. An apparatus as defined in claim 1 wherein said first stacking means at said image recording section comprises an endless belt.

3. An apparatus as defined in claim 1 wherein said second stacking means at said image recording section comprises an endless belt.

4. An apparatus as defined in claim 1 wherein said conveyance means at said image recording section comprises a suction cup for taking up the stimulable phosphor sheets stacked at said first stacking means one by one.

5. An apparatus as defined in claim 1 wherein said image recording section is provided with a rotatable bed for supporting an object, and a fluoroscopic device positioned below said sheet holding means.

6. An apparatus as defined in claim 1 wherein said third stacking means at said image read-out section comprises an endless belt.

7. An apparatus as defined in claim 1 wherein said conveyance means at said image read-out section comprises suction cups for taking up the stimulable phosphor sheets stacked on said third stacking means one by one, nip rollers and a conveyor belt for conveying the stimulable phosphor sheet to said image read-out means.

8. An apparatus as defined in claim 1 wherein said image read-out section is provided with an erasing means for erasing radiation energy remaining on the stimulable phosphor sheet after image read-out.

9. An apparatus as defined in claim 1 wherein said sheet feed means at said image read-out section comprises an endless belt.

10. An apparatus as defined in claim 1 wherein said light-tight connection means comprises a cylindrical flange formed integrally with a case of said image recording section, a cylindrical flange formed integrally with a case of said image read-out section and concentric with said cylindrical flange formed integrally with the case of said image recording section, and a light-tight seal member for sealing the space between said flanges against passage of light.

* * * * *